March 10, 1925.
O. C. TRAVER
AUTOMATIC RECLOSING CIRCUIT BREAKER SYSTEM
Filed Jan. 19, 1922
1,529,328
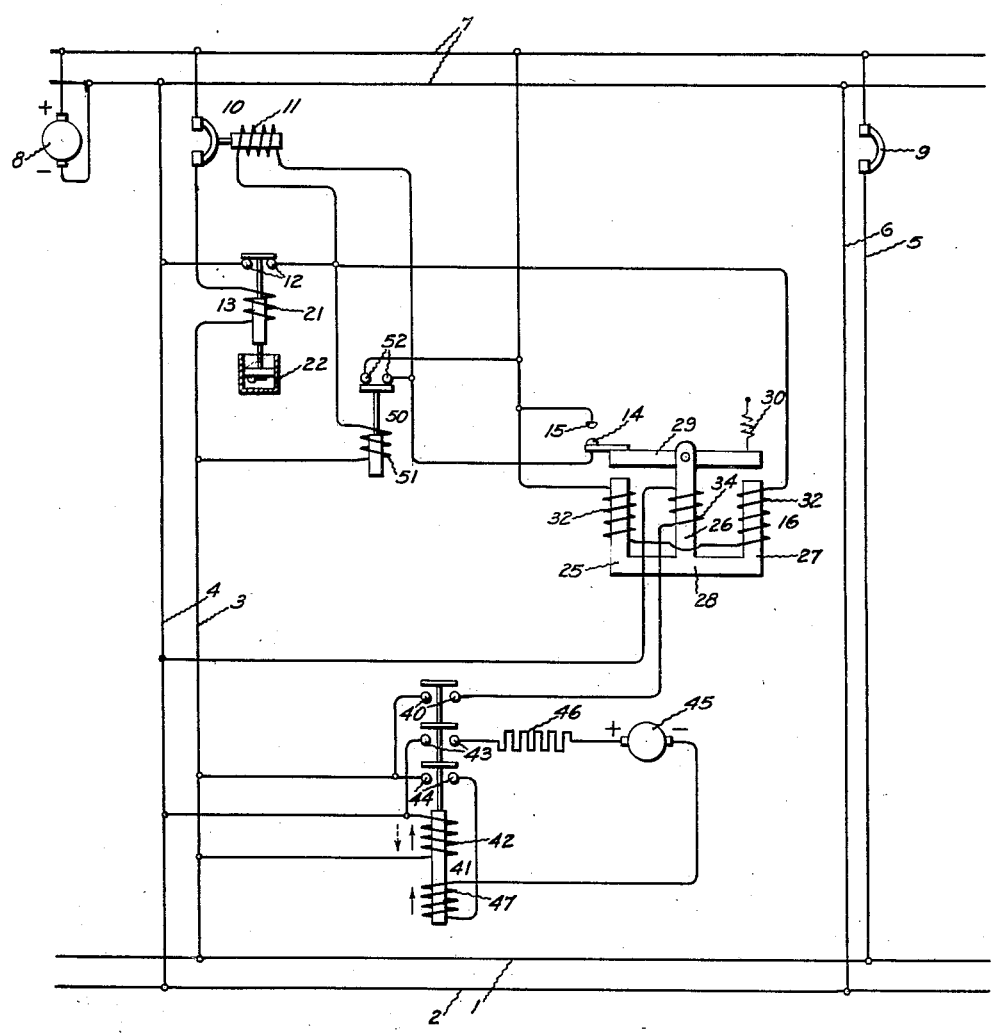
Inventor:
Oliver C. Traver,
by  
His Attorney.

Patented Mar. 10, 1925.

1,529,328

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

AUTOMATIC RECLOSING CIRCUIT-BREAKER SYSTEM.

Application filed January 19, 1922. Serial No. 530,443.

*To all whom it may concern:*

Be it known that I, OLIVER C. TRAVER, a citizen of the United States, residing at Schenectady, in the county of Schenectady, State of New York, have invented certain new and useful Improvements in Automatic Reclosing Circuit-Breaker Systems, of which the following is a specification.

My invention relates to automatic reclosing circuit breaker systems and particularly to such systems in which a circuit breaker is arranged to control the connection between a source of current and a load circuit which is arranged to be supplied with current at more than one point.

It is well known that in such systems there are two different conditions under each of which the automatic reclosing circuit breaker must function properly. One of these conditions is when the circuit breakers in all of the feeders connected to a common load circuit are opened by a short circuit and the other condition is when the circuit breaker opens due to a local overload or short circuit which does not cause all of the circuit breakers to open.

In an arrangement that has been used heretofore, it has been proposed to control the reclosing of the circuit breaker in response to the load resistance when all of the circuit breakers are opened and to control the reclosing of the circuit breaker in response to the potential across the load circuit when one or more of the circuit breakers remain closed. Such an arrangement, however, has the undesirable feature that if the potential across the load circuit rises above a predetermined value due to the reclosing of any one of the circuit breakers after all of the circuit breakers are opened by a short circuit this increase in the potential across the load circuit may cause all of the other circuit breakers to reclose irrespective of whether or not the short circuit or overload is still connected to the load circuit.

One object of my invention is to provide in an automatic reclosing circuit breaker system of the type referred to an arrangement whereby an increase in the potential across the load circuit due to the reclosing of a circuit breaker after all of the circuit breakers are opened does not cause any of the other circuit breakers to reclose unless the voltage is high enough to prevent an excessive current from flowing when the circuit breaker is closed.

My invention will be better understood from the following description taken in connection with the accompanying drawing, and its scope will be pointed out in the appended claims.

Referring to the drawing which shows one embodiment of my invention, 1—2 represents a load circuit which is arranged to be supplied with current by two feeder circuits 3—4 and 5—6 which are connected to a common supply circuit 7 which in turn is connected to a suitable source 8 such as a direct current generator. It is obvious that each feeder could be connected to a separate source if it were so desired. As shown in the drawing, the positive feeder conductor 5 which is connected to the load conductor 1 is arranged to be connected to the positive side of the supply circuit 7 by any suitable means such as a circuit breaker 9 which may be closed either automatically or manually, whereas the positive feeder conductor 3 which is connected to the load conductor 1 is arranged to be connected to the positive side of the supply circuit 7 by means of the automatic reclosing circuit breaker 10. The negative feeder conductors 4 and 6 are permanently connected to the load conductor 2 and the negative side of the supply circuit 7. The circuit breaker 10 comprises a closing coil 11 which when energized maintains the circuit breaker in its closed position. The circuit of the closing coil 11 is connected to any suitable source of current such as the supply circuit 7 by means of the contacts 12 of the overload relay 13 and the contacts 14 and 15 of the reclosing relay 16.

The overload relay 13 is provided with a winding 21 which is connected in series with the feeder circuit 3, 4 and is so arranged that it causes the relay to open its contacts when the current supplied to the load circuit exceeds a predetermined value. The overload relay 13 is also provided with any suitable means such as the dash pot 22 whereby the contacts 12 may be opened either instantly or a predetermined interval after the winding 21 is sufficiently energized to operate the relay but are not closed until a predetermined interval after the winding 21 is de-energized.

The reclosing relay 16 is a polarized relay of any suitable construction and as shown in the drawing it comprises a magnetic structure having three polar projections 25, 26 and 27, a common yoke 28 and an armature 29 pivotally mounted in front of the three polar projections. A spring 30 tends to maintain the relay in its open position in which position the contacts 14 and 15 are open. The magnetic structure may be either permanently magnetized or magnetized by a winding 32 equally distributed on the polar projections 25 and 27. This polarizing winding may be energized from any suitable source such as the supply circuit 7 and so wound that the polar projections 25 and 27 are of opposite polarity. The reclosing relay 16 is also provided with an operating winding 34 which is arranged to be connected across the feeder circuit 3, 4 by means of the contacts 40 of a selective relay 41. The relay 41 is provided with an operating coil 42 which is connected across the feeder circuit 3, 4 and is arranged to be sufficiently energized to maintain the contacts 40 open when the voltage across the load circuit is above a predetermined value. The relay 41 is also provided with contacts 43 and 44 by means of which a source of direct current 45 is connected to the load circuit 1, 2 so that the potential impressed upon the load circuit is reversed relative to the potential impressed thereon by the source 8. A high impedance 46 such as a resistor is connected in series with the auxiliary source 45 to limit the amount of reverse current which flows through the load circuit when the contacts 43 and 44 are closed. It may also be desirable in some cases to provide the relay 41 with a coil 47 which is connected in series with the source 45. The coil 47 is so wound that the magnetomotive force set up thereby opposes the magnetomotive force set up by the coil 42 when energized from the auxiliary source 45 and aids the magnetomotive force set up by the winding 42 when energized from the source 8.

The operating winding 34 of the reclosing relay 16 is wound on the polar projection 26 so that when it is energized by current from the auxiliary source 45 the polar projection 26 is of the same polarity as the polar projection 25. Therefore, the magnetomotive force produced by the current in the operating winding 34 opposes the magnetomotive force produced by the current through the portion of the polarizing winding 32 on the polar projection 25 and aids the magnetomotive force produced by the current through the portion of the polarizing winding 32 on the polar projection 27. Consequently when a predetermined voltage is impressed upon the operating winding 34 the pull exerted between the armature 29 and the polar projection 27 and the repulsion between the armature 29 and the polar projection 25 are sufficient to move the armature 29 into its closed position, against the action of the spring 30, thereby closing the contacts 14 and 15.

In my copending application, Serial No. 523,756, filed December 20, 1921, I have disclosed and claimed broadly the feature of using a polarized relay connected and arranged so as to control the reclosing of the circuit breaker in response to the load resistance.

If, however, the operating winding 34 is energized from the source 8 the polar projection 26 is of the same polarity as the polar projection 27 and the armature 29 tends to move in a counter-clockwise direction so that the contacts 14 and 15 remain open even though full voltage is impressed upon the operating winding.

In order to reclose the circuit breaker 10 when the potential across the load circuit due to some other circuit breaker being closed reaches a predetermined value, thereby indicating that the load conditions are such that an excessive current will not flow through the feeder 3, 4 when the circuit breaker is closed, I provide a voltage relay 50. This relay is provided with an operating winding 51 which is connected across the feeder 3, 4 and arranged so that it is sufficiently energized to close the contacts 52 when the voltage across the load circuit exceeds a predetermined value, usually about 50 per cent of its normal value. The contacts 52 are connected in multiple with the contacts 14 and 15 of the reclosing relay and control the circuit of the closing coil 11 of the circuit breaker.

The operation of the embodiment of my invention shown is as follows: Under normal operating conditions the circuit breakers 9 and 10 are closed and normal potential is impressed upon the load circuit 1, 2 by means of the feeders 3, 4 and 5, 6. Relays 41 and 50 therefore occupy the positions shown in the drawing. Since the contacts 40, 43 and 44 of the relay 41 are open, the operating winding 34 of the reclosing relay 16 is de-energized so that the spring 30 maintains the relay in its open position, and the auxiliary source 45 is disconnected from the load circuit 1, 2. The relay 50 completes the holding circuit of the closing coil 11. This circuit extends from the positive conductor of the supply circuit 7, through contacts 52 of the relay 50, closing coil 11, overload contacts 12 to the negative conductor of the supply circuit 7.

In case of an overload or a short circuit on the load circuit 1, 2, the overload relay 13 operates and opens its contacts 12. The opening of these contacts deenergizes the closing coil 11 of the circuit breaker, the relay 50 and the polarizing winding 32 of the reclosing relay 16. The opening of the circuit breaker 10 breaks the direct connection between the feeder conductor 3 and the positive side of the supply circuit 7. If the short circuit is severe enough to open the circuit breaker 9, the voltage across the load circuit drops to zero and the winding 42 of the relay 41 becomes deenergized so that the contacts 40, 43 and 44 close. The closing of the contact 40 connects the operating coil 34 of the reclosing relay 16 across the load circuit and the reclosing of the contacts 43 and 44 connects the auxiliary source 45 to the load circuit 1, 2 through the current limiting resistor 46 and the series coil 47. Current now flows through the load resistance and the coil 42 in the opposite direction from what it did when the circuit breakers 9 and 10 were both closed. The current through the load resistance produces a voltage drop across it in the right direction to cause the reclosing relay 16 to close its contacts 14 and 15 when the voltage drop exceeds a predetermined value. The magnetomotive force produced by the reverse current through the coil 42 opposes the magnetomotive force produced by the current through the coil 47 so that the reverse potential across the load circuit does not cause the relay 41 to operate.

A predetermined interval after the circuit breaker opens the overload relay 13 closes its contacts 12 thereby completing the circuits of the operating coil 51 of the relay 50 and the polarizing winding 32 of the reclosing relay 16. Relays 41 and 50 are so designed, however, that the low potential drop produced across the load resistance by the reverse current supplied from the auxiliary source 45 is not sufficient to operate them.

As long as the short circuit or overload remains connected to the load circuit, the potential drop across the load resistance is not large enough to operate the reclosing relay 16. When, however, the load resistance increases to a predetermined value, the voltage drop is large enough to cause the relay 16 to operate and close its contacts 14 and 15. The closing of the contacts 14 and 15 completes the circuit of the closing coil 11 which becomes energized and closes the breaker 10. Normal potential is then impressed upon the load circuit, so that the relay 50 closes its contacts 52, thereby completing a holding circuit for the closing coil 11. The restoring of normal potential across the load circuit also causes the current through the winding 47 to increase and the current through the winding 42 to reverse, so that the windings 42 and 47 aid each other. Consequently relay 41 operates instantly and disconnects the auxiliary source 45 from the load circuit 1, 2. The relay 41 is held in its operated position by the energization of the winding 42 so long as the voltage across the load circuit exceeds a predetermined value.

If, however, all of the other circuit breakers are not opened by the short circuit or overload on the load circuit 1, 2 and the potential across the load circuit does not decrease below a predetermined value, usually about 5 or 10 per cent of the normal potential, the winding 42 remains sufficiently energized to maintain the relay 41 in its operated position when the circuit breaker 10 opens, and therefore the auxiliary source 45 is not connected to the load circuit. When the potential across the load circuit increases to a predetermined value, thereby indicating that the circuit breaker 10 can be closed without an excessive current flowing through the feeders 3, 4, the voltage relay 50 closes its contacts 52 and completes the circuit of the closing coil 11 to reclose the circuit breaker 10.

Let it now be assumed that while the short circuit or overload is still connected to the load circuit and the relay 41 is deenergized so that the operating winding 34 of the reclosing relay 16 is connected across the load circuit, one of the other feeders, such as 5, 6, is reenergized by the closing of its respective circuit breaker 9 so that the voltage across the load circuit at the points where the windings 34, 42 and 51 are connected is sufficient to operate the reclosing relay 16, if it were of the right polarity, and the selective relay 41, but is not sufficient to operate the relay 50. Since the reclosing relay 16 is a very sensitive relay, it is evident that if it were an ordinary voltage responsive relay, the voltage across the load circuit at this time would cause it to close its contacts and complete the circuit of the closing coil 11 before the selective relay 41 would have time to operate. The circuit breaker 10 would then close and an excessive current would flow through the feeders 3, 4. Since, however, the reclosing relay 16 is a polarized relay and the potential impressed upon the operating winding 34 at this time is not in the right direction to cause the relay to close its contacts 14 and 15, it is evident that this increase in the potential across the load circuit due to the closing of another circuit breaker does not cause the reclosing relay to operate its contacts and complete the circuit of the operating coil 11 of the circuit breaker 10. The relay 41 operates, however, and disconnects the operating coil 34 from across the load circuit 1, 2. The reclosing of the circuit breaker is now controlled by the relay 50 which as above described completes the circuit of the closing coil when the potential across the load circuit increases to such a value that the circuit breaker can be reclosed without an excessive current flowing through the load circuit 3, 4.

From the above description it will be apparent that the circuit breaker 10 is reclosed in response to the load resistance only when all of the other circuit breakers open, and that whenever any one of the other circuit breakers is closed the circuit breaker 10 can be closed only in response to the load potential.

While I have shown and described one embodiment of my invention, I do not desire to be limited to the exact arrangement shown and described, but aim to cover in the appended claims all those modifications that fall within the true spirit and scope of my invention.

What I claim as new and desire to secure by Letters Patent of the United States, is:—

1. In an automatic reclosing circuit breaker system, the combination with a load circuit, a plurality of feeder circuits adapted to supply current to said load circuit when the load conditions are normal, circuit breakers in said feeder circuits and closing means for one of said circuit breakers, of means for controlling said closing means in response to the potential of the load circuit, means for effecting the operation of said closing means in response to the load resistance, and means for rendering said last mentioned means inoperative to effect the operation of said closing means when one or more of said circuit breakers are closed.

2. In an automatic reclosing circuit breaker system, the combination with a load circuit, a plurality of feeder circuits adapted to supply current to the said load circuit when the load conditions are normal, circuit breakers in said feeder circuits and closing means for one of said circuit breakers, of means operative only when all of said circuit breakers are open for controlling said closing means in response to the load resistance, and means for controlling said closing means in response to the potential of the load circuit when one or more of said circuit breakers are closed.

3. In an automatic reclosing circuit breaker system, the combination with a load circuit supplied with current at more than one point, a supply circuit adapted to be connected to said load circuit, a circuit breaker for controlling the connection between said load circuit and said supply circuit, and closing means for said circuit breaker, of means for supplying a reverse current to said load circuit when voltage across said load circuit drops below a predetermined value while said circuit breaker is open, a polarized relay responsive to the potential drop produced across said load circuit by said reverse current for controlling said closing means, and means controlled by the potential produced across said load circuit by current in the normal direction for controlling said closing means.

4. In an automatic reclosing circuit breaker system, the combination with a load circuit supplied with current at more than one point, a supply circuit adapted to be connected to said load circuit, a circuit breaker for controlling the connection between said load circuit and said supply circuit and closing means for said circuit breaker, of means for supplying a reverse current to said load circuit when voltage across said load circuit drops below a predetermined value while said circuit breaker is open, and means for controlling said closing means to effect the closing of said breaker operative only when the potential drop produced across the load resistance by said reverse current exceeds a predetermined value.

5. In an automatic reclosing circuit breaker system, the combination with a supply circuit, a load circuit connected to said supply circuit, a circuit breaker adapted to control the connection between said supply circuit and said load circuit and closing means for closing said circuit breaker, of means for supplying a reverse current to said load circuit when said circuit breaker is open, and means controlled by the potential drop produced across said load circuit by said reverse current for controlling said closing means.

6. In an automatic reclosing circuit breaker system, the combination with a supply circuit, a load circuit connected to said supply circuit, a circuit breaker adapted to control the connection between said supply circuit and said load circuit and closing means for closing said circuit breaker, of means for supplying a reverse current to said load circuit when said circuit breaker is open, and a polarized relay controlled by the potential drop produced across said load circuit by said reverse current for controlling said closing means.

7. In an automatic reclosing circuit breaker system, the combination with a supply circuit, a load circuit connected to said supply circuit, a circuit breaker adapted to control the connection between said supply circuit and said load circuit and closing means for said circuit breaker, of means for supplying a reverse current to said load circuit when the voltage across said load circuit drops below a predetermined value while said circuit breaker is open, means controlled by the potential drop produced across said load circuit by said reverse current for controlling said closing means, and means controlled by the potential across said load circuit for controlling said closing means if the potential across said load circuit breaker does not drop below a predetermined value or increases above said predetermined value after the circuit breaker opens.

In witness whereof, I have hereunto set my hand this 18th day of January, 1922.

OLIVER C. TRAVER.